(12) United States Patent
Williams et al.

(10) Patent No.: US 10,909,185 B2
(45) Date of Patent: Feb. 2, 2021

(54) DATABASES TO STORE METADATA

(71) Applicant: Hewlett-Packard Development Company, L.P., Houston, TX (US)

(72) Inventors: Kevin Williams, San Diego, CA (US); Amit Kumar Singh, Houston, TX (US); Gaurav Roy, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 386 days.

(21) Appl. No.: 15/880,394

(22) Filed: Jan. 25, 2018

(65) Prior Publication Data

US 2019/0228109 A1    Jul. 25, 2019

(51) Int. Cl.
| | | |
|---|---|---|
| *G06F 16/907* | (2019.01) | |
| *G06F 16/25* | (2019.01) | |
| *G06F 16/951* | (2019.01) | |
| *G06F 16/901* | (2019.01) | |

(52) U.S. Cl.
CPC .......... *G06F 16/907* (2019.01); *G06F 16/258* (2019.01); *G06F 16/9017* (2019.01); *G06F 16/951* (2019.01)

(58) Field of Classification Search
CPC .. G06F 16/907; G06F 16/258; G06F 16/9017; G06F 16/951
USPC ......................................................... 707/736
See application file for complete search history.

(56) References Cited

U.S. PATENT DOCUMENTS

| | | | |
|---|---|---|---|
| 8,825,666 B1 | 9/2014 | Lentini | |
| 2005/0021533 A1 | 1/2005 | Ayachitula et al. | |
| 2012/0246202 A1 | 9/2012 | Surtani et al. | |
| 2015/0074259 A1* | 3/2015 | Ansari | H04L 67/02 709/224 |
| 2015/0347683 A1* | 12/2015 | Ansari | H04L 9/30 726/7 |
| 2017/0230451 A1* | 8/2017 | Paramasivam | G06F 16/24573 |
| 2017/0272316 A1* | 9/2017 | Johnson | H04L 67/141 |

FOREIGN PATENT DOCUMENTS

| | | |
|---|---|---|
| CN | 105138528 A | 12/2015 |
| EP | 2315127 A1 | 4/2011 |
| EP | 2852901 A1 | 5/2015 |

* cited by examiner

*Primary Examiner* — Dung K Chau
(74) *Attorney, Agent, or Firm* — Perry + Currier inc

(57) ABSTRACT

An example of an apparatus including a network interface to receive data about a data application via an external network is provided. The apparatus further includes a collection engine in communication with the network interface to receive the data. The apparatus also includes a metadata generation engine to generate application metadata associated with the data application. The apparatus includes a memory storage unit to maintain a database of metadata. The database includes the application metadata associated with the data application. The apparatus also includes a processor to apply the database of metadata to a lookup table.

18 Claims, 7 Drawing Sheets

| Name (305) | Key Identifier (310) | Value Identifier (315-1) | Value Identifier (315-2) | Value Identifier (315-3) | Description (320-1) | Description (320-2) | Description (320-3) |
|---|---|---|---|---|---|---|---|
| ah_system_manufacturer | ASU | AS | ASUS | | code | manufacturer | |
| ah_system_manufacturer | HEW | HP | Hewlett-Packard | | code | manufacturer | |
| ah_system_manufacturer | HP | HP | Hewlett-Packard | | code | manufacturer | |
| ah_drivercrash_code | 12345671 | FAILCRIT | CRITICAL FAILURE | http://www.vendor.com/1.html | code | description | hyperlink |
| ah_drivercrash_code | 12345672 | FAILSECU | SECURITY FAILURE | http://www.vendor.com/2.html | code | description | hyperlink |

DATABASES TO STORE METADATA

BACKGROUND

Data may be stored in computer-readable databases. These databases may store large volumes of data collected over time. Processing large databases may be inefficient and expensive. Computers may be used to retrieve and process the data stored in databases.

BRIEF DESCRIPTION OF THE DRAWINGS

Reference will now be made, by way of example only, to the accompanying drawings in which:

FIG. 6 is an example of a database table.

DETAILED DESCRIPTION

Increasing volumes of data create increased complexity when storing, manipulating, and assessing the data. For example, with increases in the connectively of devices and the number of sensors in the various components of each device making time-series measurements, the generated data is increasingly voluminous and complex.

Complexity in retrieving and manipulating datasets may arise from the complex data structures of systems, system components, and component attributes and their corresponding values. In addition, such complexity may arise from the large volumes of data generated by lengthy time-series measurements related to ensembles of numerous systems. Accordingly, multiple databases of lookup datasets (each dataset corresponding to a separate system) are commonly used to compress and/or codify larger data elements. The use of multiple datasets may generate inefficiencies and redundancies. For example, the dataset may require multiple values and codes to be copied which results in larger storage requirements as well as slower performance due to the addition operations.

As an example, when an organization has electronic devices to manage, it is likely that devices need to be tracked and maintained by a central system. In this example, the users of the devices would need to be tracked and when devices fail or generates an error, the central system would need log the failure or error so that appropriate corrective measures may be taken. As many organizations allow for use of multiple devices of different models and also from multiple manufacturers, each device may report and store tracking and error messages with a different format. Accordingly, the different format may require the use of multiple databases in order to store the data.

As described herein, a database of metadata may be implemented to consolidate and simplify the management of multiple devices in an organization. For example, the database may provide a single unified lookup table capable to handle multiple devices that are tracked using multiple formats. That is, the database is capable to use and reuse a single table for several different key-value pairs and to group key-value pairs together to accommodate different data from different devices and their reporting formats.

Figure 1:
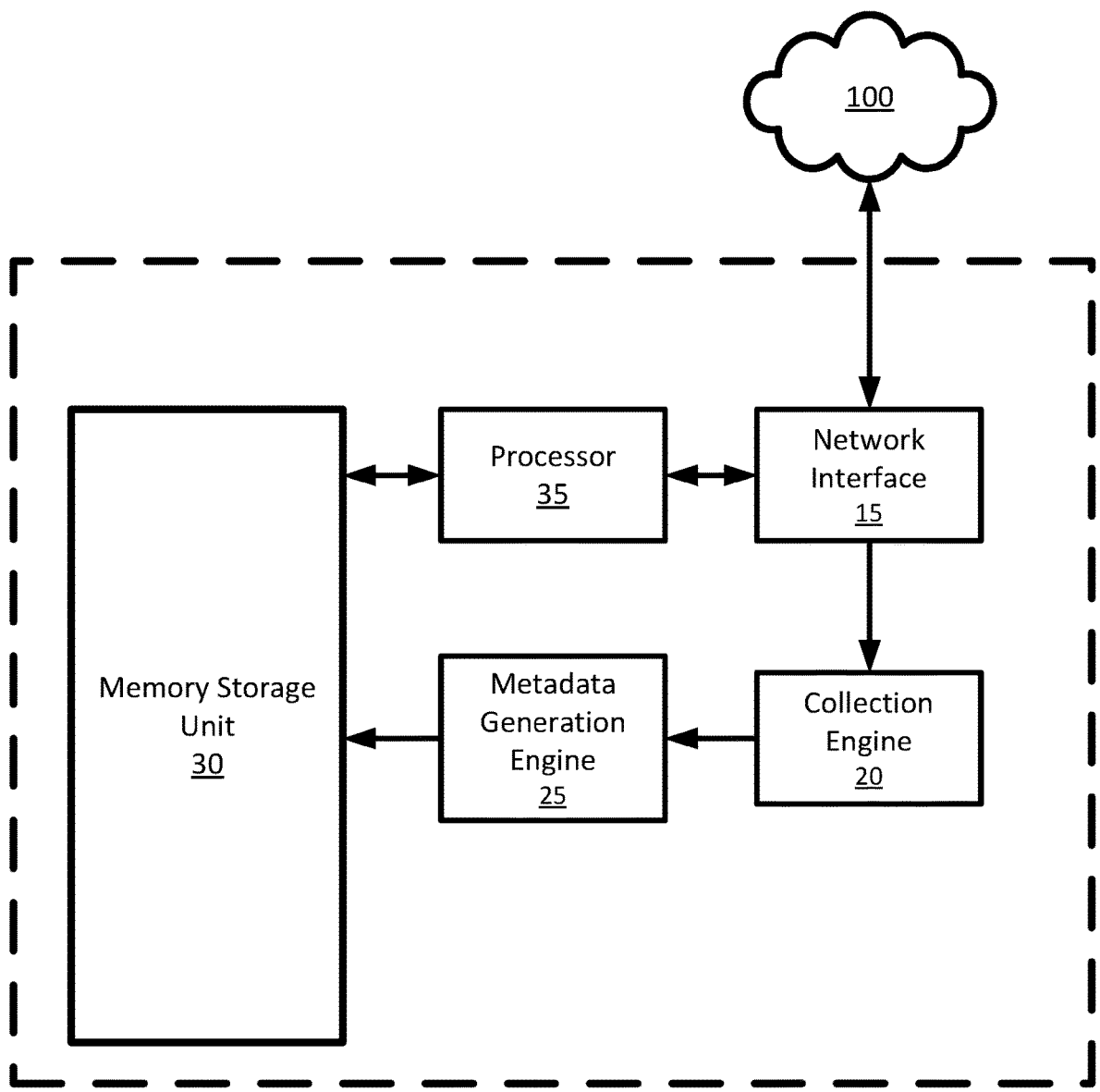
FIG. 1 is a block diagram of an example apparatus.

Referring to FIG. 1, an apparatus to modify, generate, and transform data in large datasets is generally shown at 10. The apparatus may include additional components, such as various memory storage units, interfaces to communicate with other computer apparatus or devices, and further input and output devices to interact with a user or another device. In the present example, the apparatus 10 includes a network interface 15, a collection engine 20, a metadata generation engine 25, a memory storage unit 30, and a processor 35. Although the present example shows the collection engine 20, metadata generation engine 25 and the processor 35 as separate components, in other examples, the collection engine 20 and the metadata generation engine 25 may be combined with the processor 35 and may be part of the same physical component such as a microprocessor configured to carry out multiple functions.

The network interface 15 is to receive data about a data application via a network 100. The network 100 may provide a link to another device, such as a client device of a device as a service system to send and receive data. The network interface 15 may be a wireless network card to communicate with the network 100 via a WiFi connection. In other examples, the network interface 15 may also be a network interface controller connected to via a wired connection such as Ethernet.

The data application is not particularly limited and is typically an application configured to handle a large amount of data such as to manage a device as a service system. For example, the data application may operate a device logging system or a device registration system configured to track and record information about multiple devices. Other examples where the data application may be used include complex systems with multiple components where data may be collected from the components. For example, other systems may include an automobile parts logging system, a system to store data about a human body or other biological system as represented in an electronic medical record (EMR), or DNA/RNA if encoded proteins or DNA/RNA segments which contain specific genes which may be considered components.

In the present example, the data for the data application may include information about a device. The information received is not limited and may include data about the device such as a device identifier, manufacturing information, or service dates. In other examples, the information may include a model name, device name, warranty information, service information, support information, or system crash information in the device as a service system. Comparable information may be collected in other systems described above.

The collection engine 20 is in communication with the network interface 15 and is to receive the data via the network 100 from external devices such as the client devices of the device as a service. The manner by which the collection engine 20 receives and collects the data is not particularly limited. For example, the collection engine 20 may execute a registration application where information about devices are collected and entered.

The collection engine 20 provides the collected data to the metadata generation engine 25. In the present example, the metadata generation engine 25 is to generate application metadata associated with the data application. In particular, the metadata generation engine 25 is to generate a database with key identifiers and value identifiers based on the data received by the collection engine 20. The manner by which the application metadata is generated is not particularly limited and will be discussed in more detail below.

The memory storage unit 30 is configured to receive application metadata from the metadata generation engine 25 as well as to couple to the processor 35. In the present example, the memory storage unit 30 may include a non-transitory machine-readable storage medium that may be, for example, an electronic, magnetic, optical, or other physical storage device.

In the present example, the memory storage unit 30 is to maintain a database of metadata as well as instructions to operate the data application. In addition, the memory storage unit 30 may store an operating system that is executable by the processor 35 to provide general functionality to the apparatus 10. For example, the operating system may provide functionality to additional applications. Examples of operating systems include Windows™, macOS™ iOS™, Android™, Linux™, and Unix™. The memory storage unit 30 may additionally store instructions to operate at the driver level as well as other hardware drivers to communicate with other components and peripheral devices of the apparatus 10.

The processor 35 is to apply the database of metadata to source data, such as a lookup table. In the present example, the processor 35 is in communication with the network interface 15 as well as the memory storage unit 30. The processor 35 may include a central processing unit (CPU), a microcontroller, a microprocessor, a processing core, a field-programmable gate array (FPGA), an application-specific integrated circuit (ASIC), or similar. In the present example, the processor 35 may cooperate with a memory storage unit 30 to execute various instructions. For example, the processor 35 may maintain and operate various applications with which a user may interact. In other examples, the processor 35 may send or receive data, such as input and output associated with the data application.

Although the present example shows the collection engine 20, the metadata generation engine 25, and the processor 35 as separate components, in other examples, the collection engine 20, the metadata generation engine 25, and the processor 35 may be part of the same physical component such as a microprocessor configured to carry out multiple functions. In other examples, the collection engine 20, the metadata generation engine 25, and the processor 35 may be carried out on separate servers of a server system connected by a network.

Figure 2:
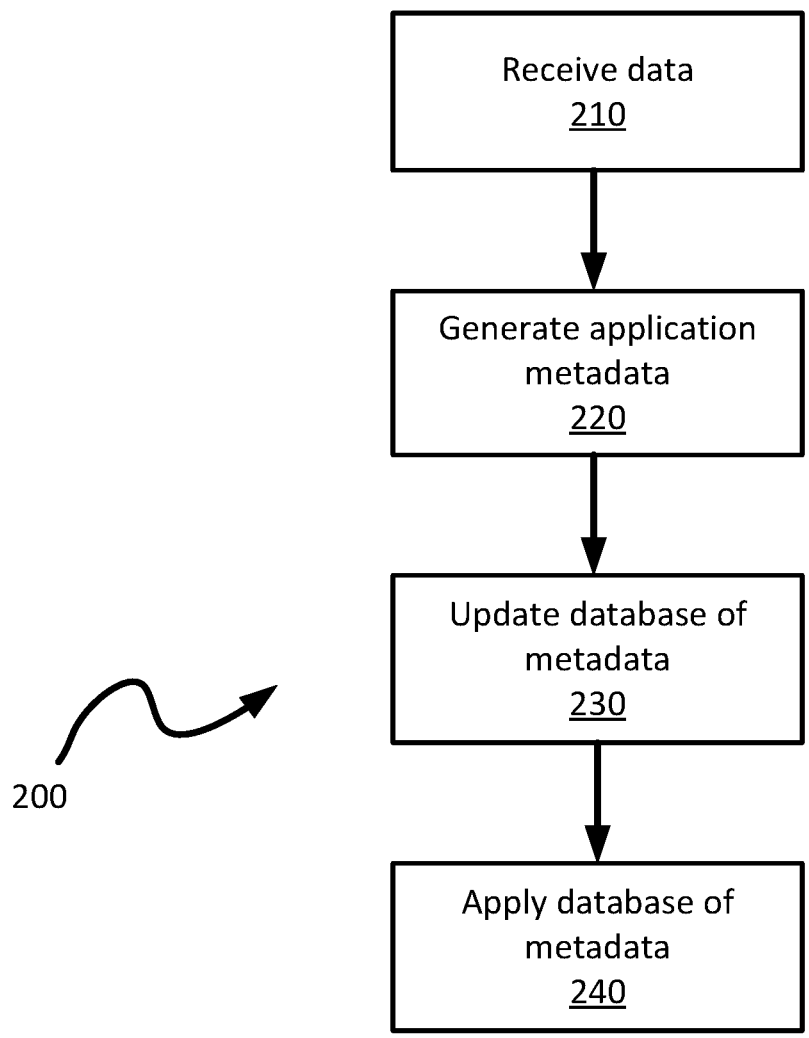
FIG. 2 is a flowchart of an example of a method.

Referring to FIG. 2, a flowchart of an example method to modify, generate, and transform data in large datasets is generally shown at 200. In order to assist in the explanation of method 200, it will be assumed that method 200 may be performed with the apparatus 10. Indeed, the method 200 may be one way in which apparatus 10 may be configured. Furthermore, the following discussion of method 200 may lead to a further understanding of the apparatus 10 and its various components. In addition, it is to be emphasized, that method 200 need not be performed in the exact sequence as shown, and various blocks may be performed in parallel rather than in sequence, or in a different sequence altogether.

Beginning at block 210, the collection engine 20 receives data associated with a data application from a device via the network interface 15. The content of the data is not limited. In an example, the data may represent a feature of the device such as a registration or error event. Furthermore, the manner by which the data is received is not particularly limited. For example, the data may be received as part of an automated device registration process or a periodic device maintenance process. In other examples, the data may be manually entered by a user during the registration process of the device. In further examples, the data may be collected automatically with an Internet of Things schema, where the device self-reports various data collected by sensors. In particular, automobiles both self-driving and not, kitchen appliances, and implanted biological devices such as pacemakers and other RFID-tagged devices may use an Internet of Things schema.

Block 220 generates application metadata associated with the data application with the metadata generation engine 25. The generation of application metadata may be an automated process described in further detail below. In the present example, the application metadata may include a key identifier received in the source data and a value identifier associated with the key identifier. The key identifier may be an element of data used to index another element of data that is meaningful, such as the associated value identifier. It is to be appreciated that the key identifier and the value identifier form a pair of identifiers that are related and may be used to retrieve the other. In addition, the application metadata may also include the name of a key set as well as descriptions for the value identifiers. Furthermore, the application metadata generated by the metadata generation engine 25 may be used to normalize data between devices that provide source data in different formats.

In particular, the key identifier may be an element of data to represent data associated with a device registered with the data application, such as in a device as a service system. For example, the element of data may represent an attribute or characteristic of a device provided to the database application, such as a device identifier, or data received from the device, such as an error or diagnostic code. The key identifier may be provided by a plurality of devices registered with the data application, such as when each device in the plurality of devices have a common attribute. Although the value identifier associated with the key identifier may be associated with a plurality of devices, it is appreciated that the key identifiers may be different for each device from the plurality of devices as discussed in more detail below.

As an example, a device to be registered by the data application may have a key identifier that is a two-letter code such as "HP". Continuing with this same example, the generated application metadata may have a value identifier "Hewlett-Packard" to describe the manufacturer associated with the two-letter code. Another device to be registered by the data application may have a key identifier that is a three-letter code such as "HEW".

It is to be appreciated that the key identifier and the value identifier are not limited to any form and may be used to represent a wide variety of data. As another example, another key set may be error handling where a key identifier may be an error code to identify a specific error in a device logged by the data application. The error code may be a number, such as a hex code. Other error codes may be a unique alphanumeric string. In this example, the value identifier may be a text string to describe the error or a Uniform Resource Locator (URL) leading to a webpage to provide information associated with the error code.

Other key identifier and associated value identifier combinations may include battery and test result; a driver crash and bug checking code; a memory and a form factor; a memory and a manufacturer; a memory and a memory type; a device and configuration errors; a system and a manufacturer; a series and an integer; an application and a country; an application and an email; and a whitelist and computers on the whitelist.

Block 230 updates the database of metadata. The manner by which the database of metadata is updated is not particularly limited. For example, the key identifier and associated value identifier may be entered into the database of metadata. In the present example, each key identifier and associated value identifier form a database record, or row in a spreadsheet. The present example uses a single database of metadata for all devices registered with the data application.

Next, block 240 applies the database of metadata to source data received from a device to map the data to the updated key identifiers and value identifiers from block 230 or the generated value identifiers prior to storage of the mapped data into a database. In the present example, source data may be received from each device connected to the data application. It is to be appreciated that the devices connected to the data application may not report source data in a uniform format. For example, one device connected to the data application may provide source data to indicate that the manufacturer is "HEWLETT-PACKARD" and another device connected to the data application may provide source data to indicate the manufacturer to be "HP". Although the manufacturer is the same for both of these devices, the processor 35 may treat these devices as though they are from two different manufacturers because the format of the source data is not the same. By mapping the source data to the same manufacturer with the database of metadata, the above two devices may be treated as though they are from the same manufacturer.

Referring back to the previous example where the key identifier and value identifier pair in this example are HP and Hewlett-Packard, respectively, it is to be understood this pair may be viewed as a lookup dataset. Furthermore, it is understood that the lookup dataset may be used in both directions. For example, for a given key identifier, the value identifier may be obtained and vice versa. Continuing with the example above, if the data application receives source data for the manufacturer with a two-letter code "HP", the data application may map the manufacturer name to "Hewlett-Packard". Similarly, if the data application receives source data for the manufacturer as the name "Hewlett-Packard", the data application may map the manufacturer to the two-letter code "HP". Therefore, if two separate devices provide the different source data, the processor 35 may normalize the data.

The application of the method 200 to consolidate all data from devices connected to the data application into a single database may enhance the performance of the data application due to efficiencies that are not possible when separate databases and tables are to be maintained. For example, the single database may be language independent which allows for compatibility with many different programming languages such that the data may be manipulated with the different programming languages.

Figure 3:
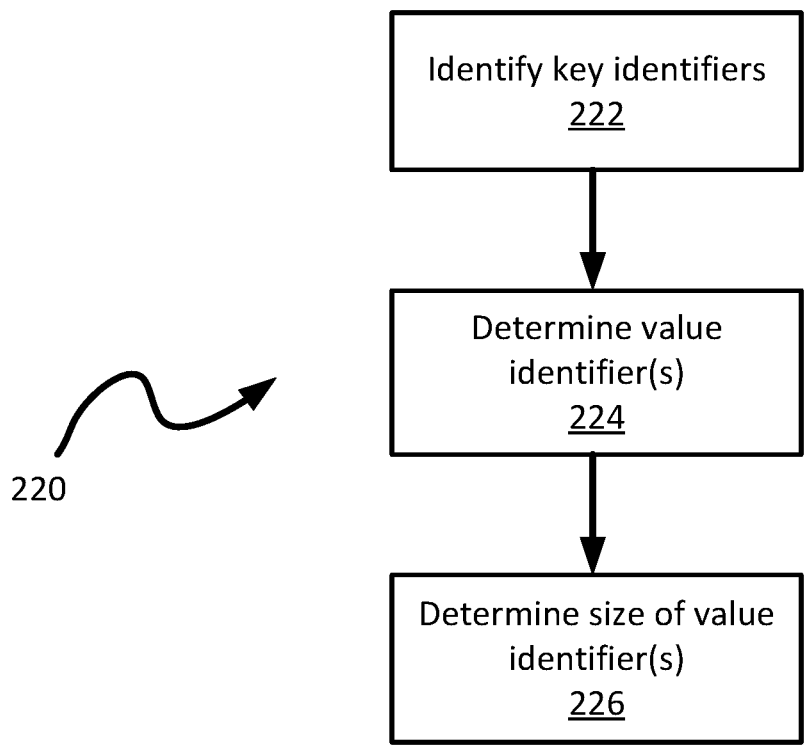
FIG. 3 is a flowchart of another example of a method.

Referring to FIG. 3, a flowchart of an example execution of block 220 to generate application metadata associated with the data application. In order to assist in the explanation of the execution of block 220, it will be assumed that the execution of block 220 may be performed with the metadata generation engine 25 subsequent to receiving source data from the registration of new devices at block 210. The following discussion of execution of block 220 may lead to a further understanding of the apparatus 10 and its various components.

Block 222 identifies the key identifiers from the received data obtained in block 210, such as when a new device is registered with the data application. The manner by which identification of the key identifiers is by a discovery process and is not particularly limited. For example, the received source data may receive information from each new device such as a device identifier, manufacturer information, and a date and time of registration with the data application. Accordingly, in this example, the manufacturing information may be identified as a key identifier with associated value identifier(s) for subsequent mapping while the other information is not considered for mapping. As discussed above, the manufacturing data from each new device registered with the data application may present the information in a different format.

In other examples where source data is received from devices to correspond to error reports, the received source data may include a device identifier, error code, and a date and time of the error. In this example, the error code is identified as the key identifier while the other data is not considered to be a key identifier in the example.

Block 224 determines the associated value identifiers for each key identifier that is identified by the execution of block 222. In the present example, each value identifier may also have an associated description. Accordingly, this process fits all value identifiers with a key identifier. The process of fitting the value identifiers is not particularly limited and may involve analysis of the dataset to determine an optimal fit. The determination of an optimal fit may be carried out with various fitting procedures, such as executing an optimization routine. Continuing with the manufacturer example, the value identifiers include all possible variations of how the source data from the registered devices will be presented for the manufacturer. Therefore, all devices that are manufactured by the same manufacturer (i.e. source) may be subsequently mapped.

Continuing with the manufacturer data example, each of the value identifiers may include a string of characters of varying length. For example, the identified key identifier may be "HP" and the associated value identifiers may be "HEW" and "Hewlett-Packard". Accordingly, devices manufactured by HEWLETT-PACKARD may include any one of the above three values to describe the manufacturer when the device is registered with the data application.

Block 226 determines the size of the value identifier associated with the key identifier determine at block 222. It is to be appreciated that each key identifier may be associated with more than one value identifier. In the present example, each value identifier is a string of characters which may include any alphanumeric value. The format of each value identifier is not particularly limited and may include any free text strings in the present example. In other examples, the value identifier may be limited to numbers and letters in specific sequences.

Furthermore, the size of each value identifier is not particularly limited. However, it is to be appreciated each value identifier may include a limit to the size of the string to be stored. In the present example, the value identifiers may each have a different size be sequenced in order of size. For example, the first value identifier may be smaller than a second value identifier, which may be smaller than a third value identifier. As a specific example for a key value identifier for the manufacturer "HP", the first value identifier may be limited to a 10 character free-text string, the second value identifier may be a 100 character free-text string, and the third value identifier may be a 200 character free-text string. However, the exact size of each value identifier may be modified depending on the data in the database. For example, the apparatus 10 may determine that the larger value identifiers are to be used, such as the first value identifier limited to a 50 character free-text string, the second value identifier limited to a 255 character free-text string, and the third value identifier limited to a 1000 character free-text string. In other examples, the size of each value identifier may be smaller.

Although the above examples provide a single key identifier, it is to be appreciated that some examples of source data may include more than one key identifier. In such cases, the execution of block 220 may be repeated for each key identifier in the received source data.

Figure 4:
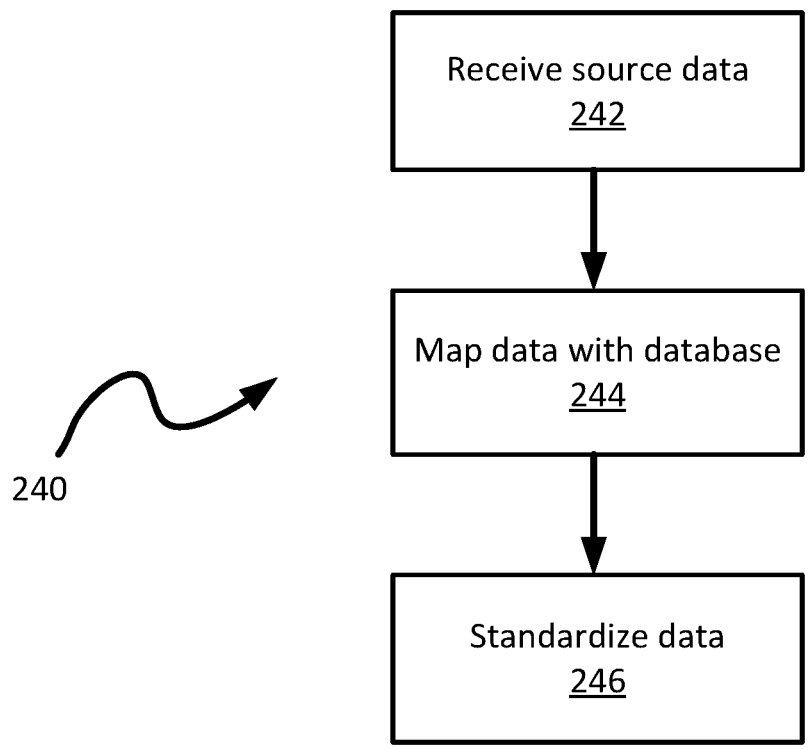
FIG. 4 is a flowchart of another example of a method.

Referring to FIG. 4, a flowchart of an example execution of block 240 to apply the database of metadata associated with the data application to source data. In order to assist in the explanation of the execution of block 240, it will be assumed that the execution of block 240 may be performed with the processor 35 upon a search of the source data from a plurality of devices registered to with data application to obtain information, such as a report on devices that may be part of a device as a service system. The following discussion of execution of block 220 may lead to a further understanding of the apparatus 10 and its various components.

Block 242 receives the source data from a device registered with the data application at the processor 35. It is to be appreciated that the processor 35 uses the same source data that the metadata generation engine 25 used to generate the application metadata.

Block 244 maps the source data using the database of metadata generated during the execution of block 220. In this process, each key identifier is mapped using the information in the database of metadata. For example, if the source data includes the value identifiers "Hewlett-Packard" for a manufacturer, the device is to be mapped to the code "HP", which may be a key identifier or another value identifier.

Block 246 standardizes the source data. The manner by which the data is standardized is not particularly limited and may involve the selection of a format to present the data. For example, the format may be selected to be a human readable value, such as "Hewlett-Packard" or may be selected to include shorter unique string codes to improve search efficiencies.

Although the above example applies the database of metadata to source data from a single device, it is to be appreciated that source data from all devices connected to the data application may be processed in this manner to generate a standardize database. In such cases, the execution of block 240 may be repeated for received source data from each device. Despite devices being potentially from different manufacturers or having different characteristics, the use of mapping all source data to key identifiers provides the ability to store all data into a single database such that there is a single point of control and storage to improve efficiencies over the alternative of hard-coding multiple lookup tables. In particular, the method 200 is particularly useful to modify, generate, and transform data in large datasets, such as in a device as a service application.

Figure 5:
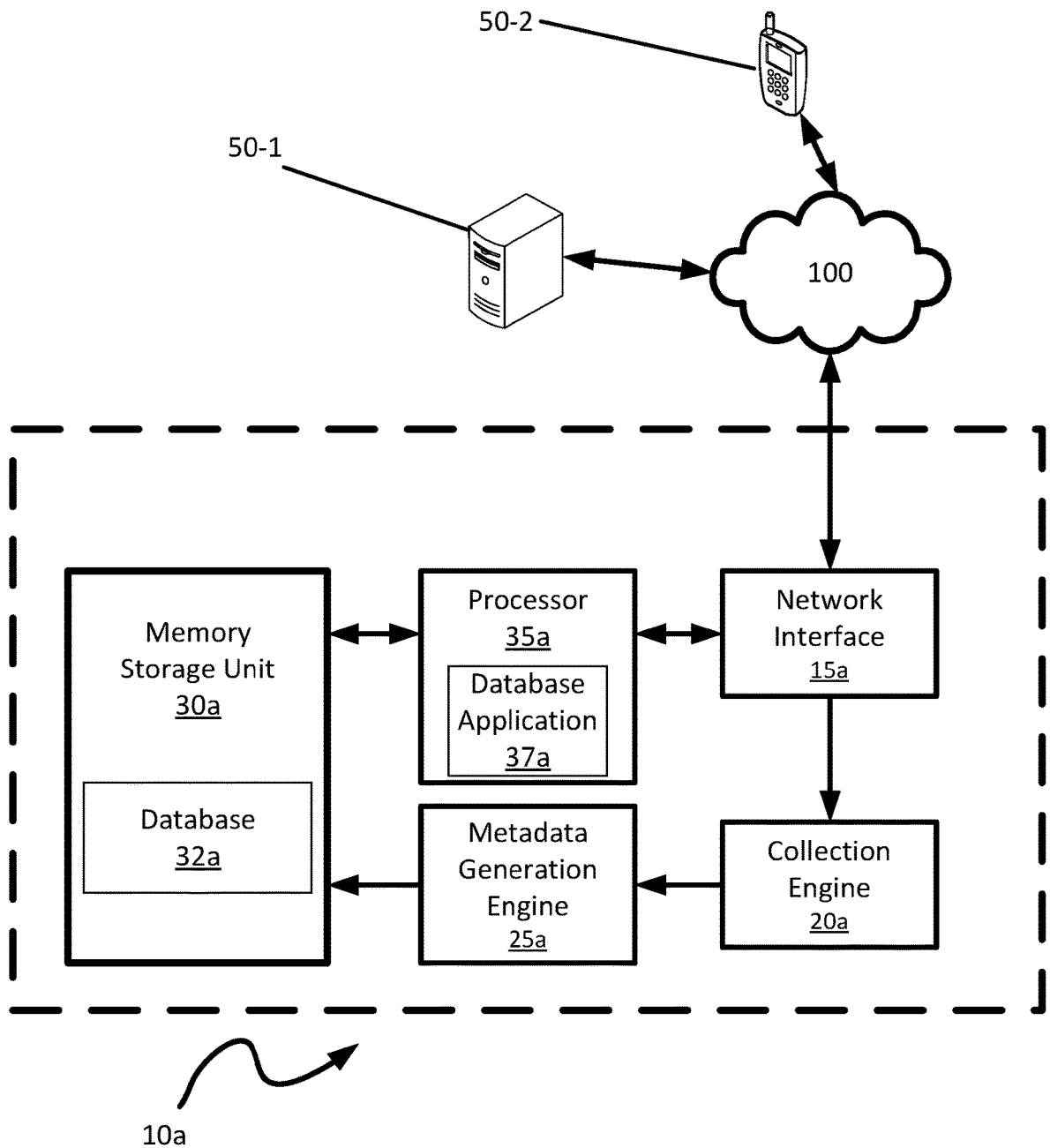
FIG. 5 is a block diagram of another example apparatus.

Referring to FIG. 5, another example of an apparatus to modify, generate, and transform data in large datasets is shown at 10*a*. Like components of the apparatus 10*a* bear like reference to their counterparts in the apparatus 10, except followed by the suffix "a". The apparatus 10*a* includes a network interface 15*a*, a collection engine 20*a*, a metadata generation engine 25*a*, a memory storage unit 30*a*, and a processor 35*a*.

In the present example, the apparatus 10*a* is to operate a device as a service system. In particular, the device as a service system is an Internet of Things solution, where devices, users, and companies are treated as components in a system that facilitates analytics-driven point of care. In particular, the apparatus 10*a* manages a plurality of devices 50-1 and 50-2 (generically, these devices are referred to herein as "device 50" and collectively they are referred to as "device 50", this nomenclature is used elsewhere in this description).

In this example, the devices 50 are registered with the data application 37*a* running on the processor 35*a*. The data application 37*a* reads and writes to the database 32*a*. In this example, the database 32*a* is a single database to store the information about all devices 50 that have been registered and are managed by the data application 37*a*.

Referring to FIG. 6, an example of the database of metadata is shown generally at 300. The database of metadata is shown in the form of a table 300. The following discussion of table 300 may lead to a further understanding of the apparatus 10 as well as the method 200 and their various components. The table includes a plurality of columns to store data. In this example, each row of the table 300 may represent a record associated with a device and/or an event such as an error. The columns include a name column 305, a key identifier column 310, value identifier columns 315-1, 315-2, 315-3, and description columns 315-1, 315-2, 315-3.

The name column 305 includes data that represents a key set. In the present example shown in FIG. 6, the database of metadata includes two key sets. The first key set "ah_system.manufacturer" is associated with manufacturer information. The second key set "ah_drivecrash.code" is associated with an error report, such as a driver crash.

The column 310 includes data that represents a key identifier. This is information provided by the device in the source data. In regard to the manufacturer information, the column 310 may include a code to represent a manufacturer. It is to be appreciated that the code may not be uniform across all devices and that codes from different devices from the same manufacturer may be different. In this example, "HEW" and "HP" are used in different source data to represent HEWLETT-PACKARD as the manufacturer. The key identifier for the error report may be a unique error code provided by the operating system or the application.

The value identifier columns 315 are not particularly limited. In the present example, the value identifier columns 315 are free text strings. The content of the value identifier columns 315 are not particularly limited and are generally determined in the execution of block 220 described above. In the present example, there are three value identifier columns 315. In other examples, more value identifier columns 315 may be provided or fewer value identifier columns 315 provided. In addition, the size of the value identifier columns 315 is not identical. In this example, the value identifier column 315-1 is smaller than the value identifier column 315-2, which is smaller than the value identifier column 315-3. Furthermore, not all columns need to be populated. As shown in the present example, the manufacturer key set does not use the value identifier column 315-3.

The description columns 320 are used to describe the contents in each of the value identifier columns 315, respectively. It is to be appreciated that by allowing the content of each value identifier column 315 to be able to store any data, a single database may be used for all source data.

Figure 7A:
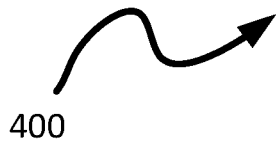
FIGS. 7A-C are examples showing the application of a database to data.
Figure 7B:
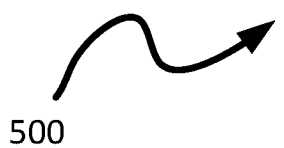
Figure 7C:

Referring to FIGS. 7A-C, an example of source data received at the apparatus and its transformation by the processor 35 using the database of metadata is generally shown at 400. Beginning in FIG. 7A, the source data is received in with three columns. The device identifier column 405 includes information about a specific device. The device identifier is not particularly limited and may be a serial number, a media access control address, or a number assigned by the database application of the apparatus. The manufacturer column 405 includes information regarding manufacturer provided by the device. As shown in FIG. 7A, a device may provide a different manufacturer name (i.e. HEWLETT-PACKARD and HP). The data column 415 provides information about when the data record was created.

FIG. 7B shows the data mapping the manufacture column 510 with the database of metadata in the table 500 having a device identifier column 505, a manufacturer column 510 and the date column 515. The mapping process may be carried out with the procedure described above in block 244. In this example, the apparatus mapped the information in the manufacturer column 510 to two letter codes to represent a country from the value identifier column 315-1. It is to be appreciated that the value identifiers in column 315-1 may represent an efficient manner to compress the data such that searches for this data may be carried out faster.

FIG. 7C shows the data mapping the standardization of the data in the table 600 with a device identifier column 605, a manufacturer column 610 and the date column 615. The standardization process may be carried out with the procedure described above in block 246 to provide the information in the manufacturer column 610 in a readable form where the manufacturer information may be presented to a user.

It is to be recognized that features and aspects of the various examples provided above may be combined into further examples that also fall within the scope of the present disclosure.

What is claimed is:

1. An apparatus comprising:
a network interface to receive data about a data application via an external network;
a collection engine in communication with the network interface to receive the data;
a metadata generation engine to generate application metadata associated with the data application, wherein the application metadata includes key identifiers and associated value identifiers for different key sets that define different types of data;
a memory storage unit to maintain a database of metadata, wherein the database includes the application metadata associated with the data application;
a processor to apply the database of metadata to source data associated with a plurality of managed electronic devices registered with the data application to map the source data to the key identifiers and the value identifiers in the application metadata; and
the processor further to standardize output of the source data by selecting a key identifier or a value identifier to be outputted for a respective key set.

2. The apparatus of claim 1, wherein the application metadata includes a key identifier and a first value identifier, wherein the first value identifier is associated with the key identifier.

3. The apparatus of claim 2, wherein the application metadata further includes a second value identifier, and wherein the first value identifier is a first string of characters and the second value identifier is a second string of characters.

4. The apparatus of claim 3, wherein the second string is longer than the first string.

5. The apparatus of claim 2, wherein the key identifier represents data associated with a managed electronic device registered with the data application.

6. The apparatus of claim 5, wherein the first value identifier is associated with the plurality of managed electronic devices registered with the data application.

7. The apparatus of claim 6, wherein each of the plurality of managed electronic devices has a common attribute.

8. The apparatus of claim 1, wherein the key sets define manufacturer information and error information.

9. The apparatus of claim 1, wherein the source data is in different formats.

10. The apparatus of claim 1, wherein the database of metadata includes a table, and wherein the different key sets use different columns of the table for respective key identifiers and respective value identifiers.

11. A method comprising:
receiving data from a device via a network interface, wherein the data represents a feature of the device;
generating application metadata associated with the data with a metadata generation engine, wherein the application metadata is to normalize the data;
updating a database of metadata maintained on a memory storage unit, the database to include the application metadata; and
applying the database of metadata to a lookup table.

12. The method of claim 11, wherein generating the application metadata comprises generating a key identifier and a first value identifier, wherein the first value identifier is associated with the key identifier.

13. The method of claim 12, further comprising generating a second value identifier, wherein the second value identifier is larger than the first value identifier.

14. The method of claim 11, further comprising identifying a plurality of devices registered with a data application.

15. The method of claim 14, wherein the plurality of devices have a common attribute.

16. A non-transitory machine-readable storage medium encoded with instructions executable by a processor, the non-transitory machine-readable storage medium comprising:
instructions to receive source data associated with a data application from a plurality of managed electronic devices registered with the data application via a network;
instructions to generate application metadata associated with the data application with a metadata generation engine, wherein the application metadata includes key identifiers and associated value identifiers for different key sets that define different types of data;
instructions to maintain a database of metadata on a memory storage unit;
instructions to update the database to include the application metadata associated with the data application;
instructions to apply the database of metadata to the source data to map the source data to the key identifiers and the value identifiers in the application metadata; and
the processor further to standardize output of the source data by selecting a key identifier or a value identifier to be outputted for a respective key set.

17. The non-transitory machine-readable storage medium of claim 16, further comprising instructions to generate a key identifier and a first value identifier, wherein the first value identifier is associated with the key identifier.

18. The non-transitory machine-readable storage medium of claim 17, further comprising instructions to generate a second value identifier, wherein the second value identifier is larger than the first value identifier.

* * * * *